(12) United States Patent
Hirsch

(10) Patent No.: US 10,920,404 B2
(45) Date of Patent: Feb. 16, 2021

(54) CONTROL UNIT FOR UNDERSINK APPLIANCES

(71) Applicant: EMERSON ELECTRIC CO., St. Louis, MO (US)

(72) Inventor: Nicholas J. Hirsch, Wind Lake, WI (US)

(73) Assignee: EMERSON ELECTRIC CO., St. Louis, MO (US)

( * ) Notice: Subject to any disclaimer, the term of this patent is extended or adjusted under 35 U.S.C. 154(b) by 0 days.

(21) Appl. No.: 16/514,514

(22) Filed: Jul. 17, 2019

(65) Prior Publication Data

US 2019/0338501 A1    Nov. 7, 2019

Related U.S. Application Data

(63) Continuation of application No. 15/565,294, filed as application No. PCT/US2016/028088 on Apr. 18, 2016, now Pat. No. 10,407,884.

(Continued)

(51) Int. Cl.
*E03C 1/05* (2006.01)
*H02J 3/14* (2006.01)
*E03C 1/04* (2006.01)

(52) U.S. Cl.
CPC ............... *E03C 1/055* (2013.01); *E03C 1/04* (2013.01); *E03C 1/0403* (2013.01); *H02J 3/14* (2013.01);

(Continued)

(58) Field of Classification Search
CPC .......... E03C 1/04; E03C 1/0403; E03C 1/055; E03C 2001/0416; H02J 2310/14;

(Continued)

(56) References Cited

U.S. PATENT DOCUMENTS 3,510,069 A * 5/1970 Hannum ................. B02C 25/00
  241/33
5,180,140 A   1/1993 Araki
(Continued)

FOREIGN PATENT DOCUMENTS

CN    101137797 A   3/2008
CN    103975112 A   8/2014
(Continued)

OTHER PUBLICATIONS

International Search Report and Written Opinion of the International Searching Authority issued in PCT/US2016/028088, dated Feb. 10, 2017, ISA/EPO Rijswijk.

(Continued)

*Primary Examiner* — Kidest Bahta
(74) *Attorney, Agent, or Firm* — Harness, Dickey & Pierce, P.L.C.

(57) ABSTRACT

A control unit is located under a kitchen sink. The control unit controls the timing of the power demand from each device so that they can all be run from a single electrical circuit coupled to the control unit. The control unit also accommodates sensors and other accessories such as flow meters, electronic faucets, leak detectors, shutoff valves, and state communication either wired or wireless which allows these sensors and other accessories to be added with little additional cost beyond the cost of the sensors and other accessories.

13 Claims, 8 Drawing Sheets

Related U.S. Application Data

(60) Provisional application No. 62/152,090, filed on Apr. 24, 2015.

(52) U.S. Cl.
CPC ... *E03C 2001/0416* (2013.01); *H02J 2310/14* (2020.01); *Y02B 70/30* (2013.01); *Y02B 70/3225* (2013.01); *Y04S 20/222* (2013.01); *Y04S 20/242* (2013.01)

(58) Field of Classification Search
CPC ........ H02J 3/14; Y02B 70/30; Y02B 70/3225; Y02B 70/3266; Y04S 20/222; Y04S 20/242
See application file for complete search history.

(56) References Cited

U.S. PATENT DOCUMENTS

| | | | |
|---|---|---|---|
| 2003/0088338 A1* | 5/2003 | Phillips | F16K 19/006 700/282 |
| 2006/0186215 A1 | 8/2006 | Logan | |
| 2010/0206409 A1 | 8/2010 | Gautschi et al. | |
| 2010/0206956 A1 | 8/2010 | Gautschi et al. | |
| 2011/0064624 A1* | 3/2011 | McGee | C02F 1/72 422/187 |
| 2012/0000858 A1* | 1/2012 | Butler | C02F 1/008 210/741 |
| 2013/0116848 A1 | 5/2013 | Goto et al. | |
| 2013/0291959 A1 | 11/2013 | Chen et al. | |
| 2014/0215709 A1 | 8/2014 | Nightlinger et al. | |
| 2015/0115082 A1* | 4/2015 | Gormley | B02C 18/0092 241/46.016 |
| 2016/0192524 A1* | 6/2016 | Ruben | A61N 1/3754 607/116 |

FOREIGN PATENT DOCUMENTS

| | | |
|---|---|---|
| EP | 2218839 A1 | 8/2010 |
| EP | 2218840 A1 | 8/2010 |
| EP | 2639920 A2 | 9/2013 |

OTHER PUBLICATIONS

First Chinese Office Action regarding CNSN 2016800365741, dated May 20, 2019.

\* cited by examiner

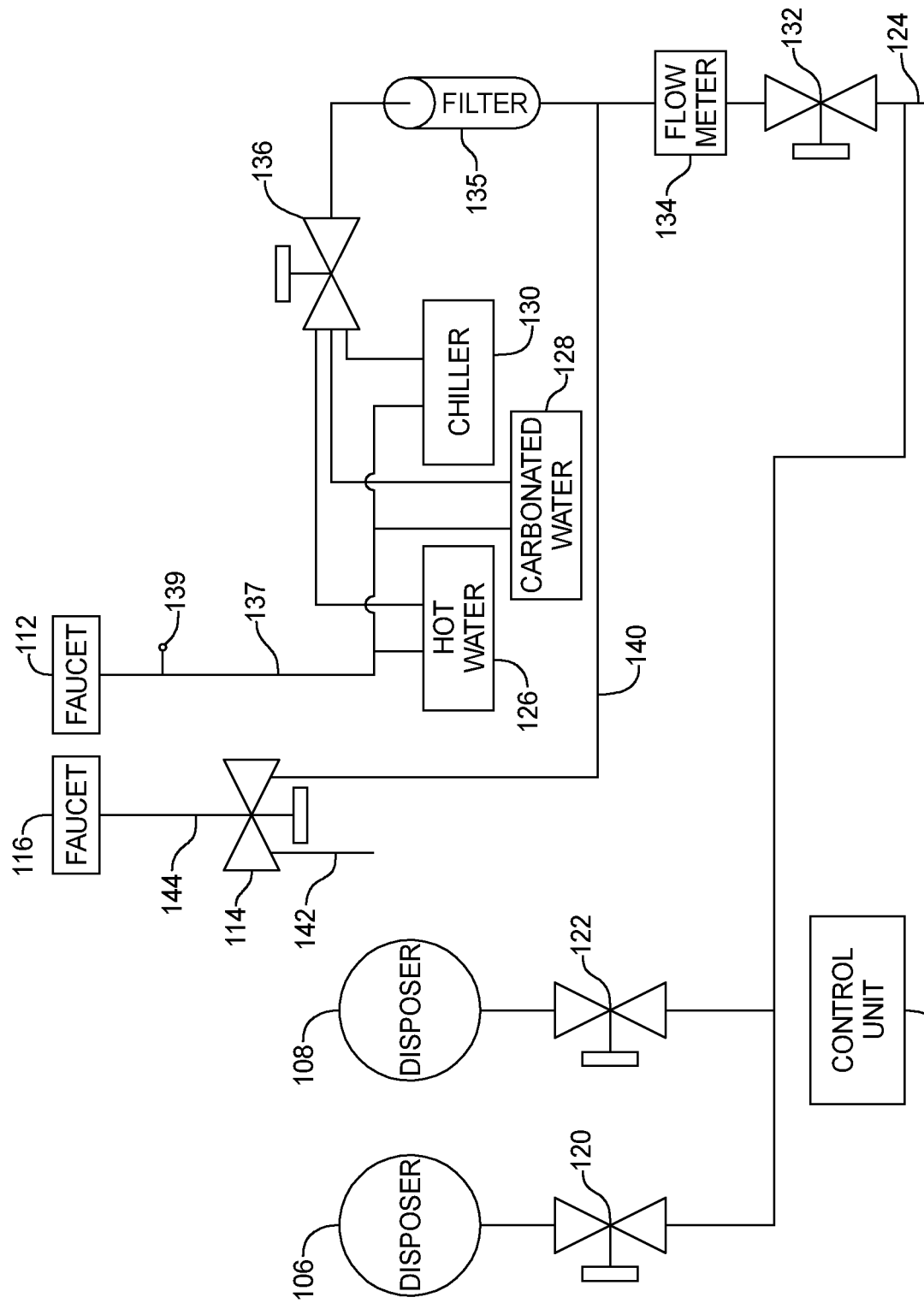

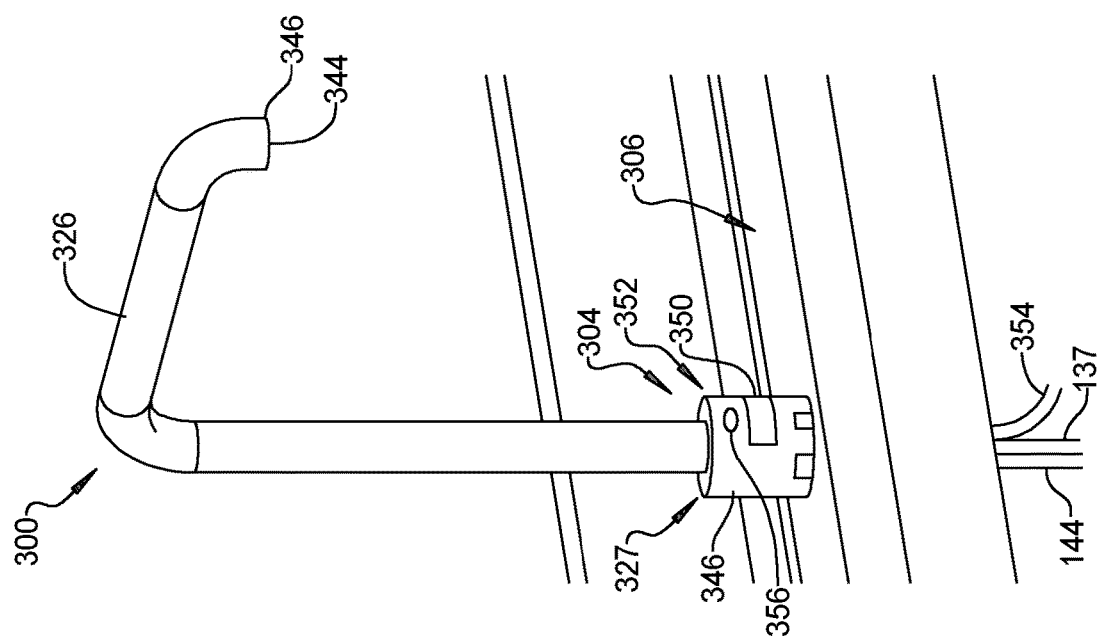
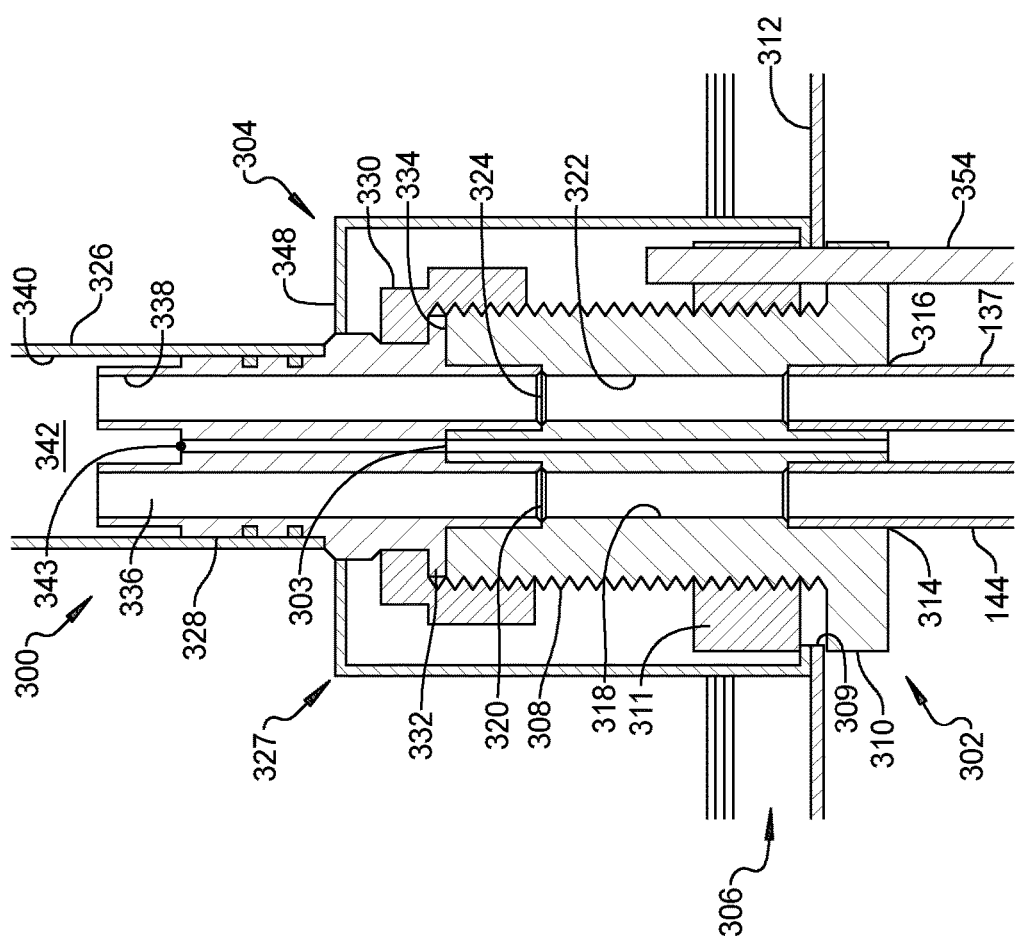

CONTROL UNIT FOR UNDERSINK APPLIANCES

CROSS-REFERENCE TO RELATED APPLICATIONS

This application is a continuation application of U.S. Ser. No. 15/565,294 filed on Oct. 9, 2017. U.S. Ser. No. 15/565,294 is a 371 National Phase Application of International Application PCT/US2016/028088, filed on Apr. 18, 2016, which claims the benefit of U.S. Provisional Application No. 62/152,090 filed on Apr. 24, 2015. The entire disclosures of the above applications are incorporated herein by reference.

FIELD

The present disclosure relates to an under sink control unit for controlling a food waste disposer and water dispensing devices installed to or in proximity to the sink.

BACKGROUND

This section provides background information related to the present disclosure which is not necessarily prior art.

As the desire for amenities to be provided in kitchens grows, there are increased demands for electrical and/or electronic products that are installed beneath the kitchen sink. Often there is only one electrical circuit under the sink and the electrical demands of devices such as a water chiller, hot water dispenser and food waster disposer can outstrip the capacity of the electrical circuit. This can result in limiting the number of electrical/electronic devices that are installed under the sink or the installation (if possible) of additional electrical circuits under the sink which requires that additional electrical power lines be run under the sink.

A device such as the SinkTop Switch™ air switch module available from the InSinkErator division (Racine, Wis.) of Emerson Electric Co. has a single electrical circuit with two outlets and allows for a food waste disposer and one other device such as a chiller or hot water dispenser to be powered by the single electrical circuit. When used with a food waste disposer and a hot water dispenser or water chiller, the food waste disposer is plugged into one of the outlets and the other device (hot water dispenser or water chiller) is plugged into the other device. The air switch module has an air activated micro switch that switches power from one of the outlets to the other outlet each time an activator of the micro switch is pressed. Typically, the hot water dispenser or water chiller is powered and the user presses the activator to turn power on to the food waste disposer, which turns power off to the hot water dispenser or water chiller, and then presses it again to turn power off to the food waste disposer which turns power back on to the hot water dispenser or water chiller. Such an air switch module has the limitations that is only one device in addition to the food waste disposer can be added and it is not smart.

In a typical hot water dispensing system, the valve that controls the flow of water tends to be located in a faucet of the hot water dispensing system. As such, designers must find existing valves and incorporate them into the design of the faucet or design a new valve. This makes the faucet more expensive and limits the flexibility of design of the faucet. This results in increased inventory carrying costs since faucets having multiple finishes and multiple designs must be stocked. It also results in increased time to market with new faucet designs due to increased design and approval complexity. Locating the valve away from the faucet requires that the valve be electrically or electronically controlled, such as a solenoid valve, and an electrical or electronic controller added to the system, resulting in increased system cost.

Lower cost water dispensing systems typically have simple electromechanical thermostats to control the temperature of the water. As such, these systems are not programmable and have a set, constant water temperature. This can result in wasted energy due to the water being heated or cooled when there is no demand, such as late at night or early morning. Also, tight temperature control is difficult with these types of simply thermostats so the temperature of the water cannot always be maintained at optimal temperature.

There have been a number of prior art food waste disposers having a controller that is configured to control the food waste disposer in ways that improve its performance. The controller can for example control the speed of the motor of the food waste disposer and water flow, such as to adjust motor speed and water flow to optimize grind and control water. However, most food waste disposers are operated with a wall or air switch that doesn't include any type of controller that can be used to control motor speed, such as for improved grind performance, water flow, diagnose issues, communicate those issues to a user, and the like. Adding a separate controller to a food waste disposer solely to add this type of functionality increases the cost of the food waste disposer beyond what many consumers are typically willing to pay, which has typically been the experience with smart food waste disposers that have been on the market. The same can be said for water dispensing systems. While it would be desirable to have a controller that for example senses and communicates water temperature, filter life or leak detection, such as to a user, many consumers are not willing to pay the increased cost for such a controller.

When a new electrical or electronic device is added under the sink, this device typically must have its own controls, for example, a thermostat for a hot water dispenser or chiller, a motor controller for a disposer (which in many cases is simply an on-off switch), etc. There is of course a cost associated with the controls of each such device.

In many cases, users rarely go under the kitchen sink except for the occasional cleaning supplies. Small water leaks under the sink can thus go undetected and may cause significant damage. Simple leak detection devices are available and they require the user to interact to shut off the source of the leak. Other more complicated leak detection is available that will shut off the water supply but usually these monitor flow and require a catastrophic leak before they operate.

SUMMARY

This section provides a general summary of the disclosure, and is not a comprehensive disclosure of its full scope or all of its features.

In accordance with an aspect of the present disclosure, a control unit for controlling a plurality of undersink appliances has a plurality of controlled power outputs at which the control unit turns power on and off. The controlled power outputs are couplable to the undersink appliances. The plurality of controlled power outputs include at least one food waste disposer power output for one of the undersink appliances that is a food waste disposer and at least one water dispensing device power output for one of the undersink appliances that is a water dispensing device. The control unit is configured with control logic responsive to a user input that power at the food waste disposer power output is to be turned on to turn power on at the food waste disposer power output and before doing so turning power off at the water dispensing device power output. The control unit is also configured with control logic to set functionality for the food waste disposer that includes on/off, auto-off and troubleshooting of the food waste disposer wherein the control unit is responsive to input signals received from the food waste disposer and configured with control logic to determine if the food waste disposer is jammed or the motor of the food waste disposer is overheated.

In an aspect, the control unit is configured with control logic to set functionality for the water dispensing device that includes setting a temperature profile for that water dispensing device and controlling the water dispensing device power output for that water dispensing device based on the temperature profile and a temperature signal indicative of temperature of water in that water dispensing device, the control unit also configured with control logic that includes troubleshooting the water dispensing device wherein the control unit is responsive to a signal received from the water dispensing device and configured with control logic to determine if the water dispensing device is operating properly.

In an aspect, the troubleshooting includes when the food waste disposer is jammed or its motor overheated, the control unit communicating to a desired destination that the food waste disposer is jammed or its motor overheated and when the water dispensing device is not working communicating to the desired destination that the water dispensing device is not working.

In an aspect, the undersink appliances include a water filter and the control unit includes an input that receives a signal indicative of a rate of flow of water through a flow meter. The control unit is configured with control logic to determine a remaining useful life of a filter in series with the flow meter based on the amount of water that has flowed through the flow meter and to communicate to a desired destination information about a remaining life of the filter which includes a user alert when a predetermined amount of water has flowed through the flow meter and resetting a filter life after the filter or a filter media of the filter is replaced.

In an aspect, the control unit is responsive to an input signal from a leak detector and configured with control logic to control a controlled valve to shut water off and communicating a leak alert to a desired destination.

In an aspect, the plurality of controlled power outputs include a plurality of water dispensing device power outputs for undersink appliances that are water dispensing devices, the control unit configured with control logic to turn power off at all the water dispensing device power outputs when the control unit is to turn power on at the food waste disposer power output prior to turning power on at the food waste disposer power output.

In an aspect, the control unit is configured with control logic responsive to a monitoring signal received at an input of the control unit for each water dispensing device coupled to one of the water dispensing device power outputs that is indicative of conditions of water in the water dispensing device and to cycle power on and off at the water dispensing device power output to maintain the condition of water in the water dispensing device at desired condition.

In an aspect, the plurality of controlled power outputs include a plurality of food waste disposer power outputs and the control unit is configured with control logic responsive to a user input selecting which food waste disposer power output is to be powered on and turning power on at only the food waste disposer output selected by the user and turning power off at all the other controlled power outputs before turning power on at the selected food waste disposer power output.

In an aspect, the control unit is configured with control logic so that it limits the controlled power outputs to which the control unit turns power on so that current drawn from the controlled power outputs does not exceed a maximum rated input current of the control unit. In an aspect, the maximum rated input current of the control unit is a maximum rated current of an electrical power outlet that provides power to the control unit.

DRAWINGS

The drawings described herein are for illustrative purposes only of selected embodiments and not all possible implementations, and are not intended to limit the scope of the present disclosure.

FIG. 2 is a simple schematic of the water interconnections of FIG. 1;

FIG. 3 is a cross-section of faucet base and faucet head of a faucet in accordance with an aspect of the present disclosure; and FIG. 4 is a perspective view of the faucet of FIG. 3.

DETAILED DESCRIPTION

Figure 1:
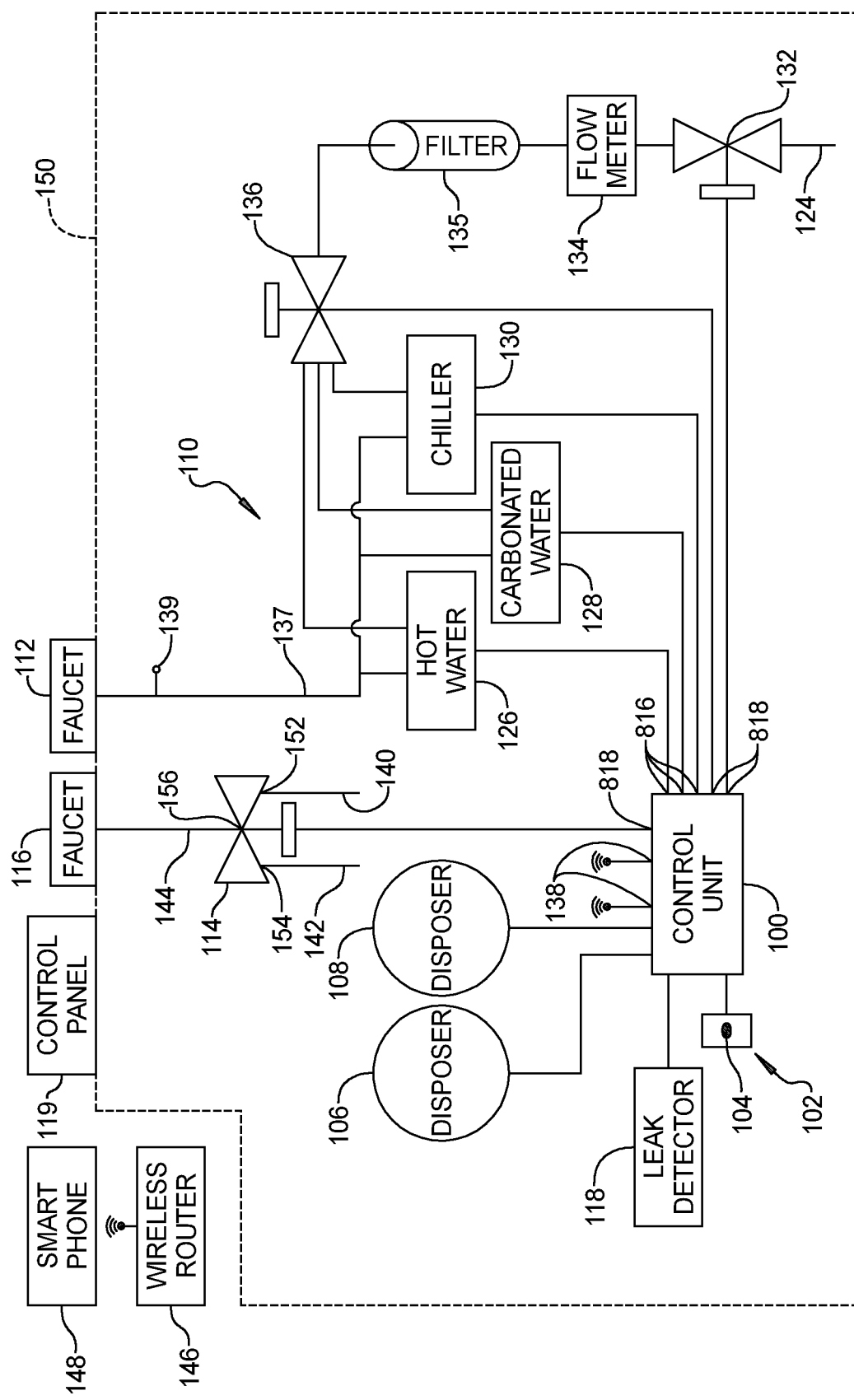
FIG. 1 is a simple schematic of an arrangement of food waste disposers and water dispensing devices coupled to an under sink control unit in accordance with an aspect of the present disclosure.

Example embodiments will now be described more fully with reference to the accompanying drawings. Corresponding reference numerals indicate corresponding parts throughout the several views of the drawings. The description and specific examples are intended for purposes of illustration only and are not intended to limit the scope of the present disclosure.

In accordance with an aspect of the present disclosure, a control unit is located under a kitchen sink and is coupled to an electrical circuit that provides power to the control unit. In an aspect, the control unit includes a controller and inputs and outputs wherein the controller controls the outputs based on signals received at the inputs. In an aspect, the control unit controls the timing of the power demand from each device coupled to the control unit so that they can all be run from this single electrical circuit. The control unit also accommodates sensors and other accessories such as flow meters, electronic faucets, leak detectors, shutoff valves, and state communication either wired or wireless which allows these sensors and other accessories to be added with little additional cost beyond the cost of the sensors and other accessories. The control unit then utilizes these sensors and other accessories to provide the user with control and awareness of what is happening under the sink as well as the devices being controlled by the control unit.

In an aspect, a controlled valve for a water dispensing system is separate from the faucet of the water dispensing system and controlled by the control unit in response to an actuation member being actuated. In an aspect, the actuation member is a handle of the faucet. In an aspect, the actuation member is a push button or a knob that is part of the faucet or located in proximity to the faucet. In an aspect, the water dispensing system includes one or more of different types of water dispensing devices, such as hot water, carbonated water and chilled water. In an aspect, the controlled valve is configured to accommodate the devices for all the water dispensing technologies that are utilized.

In an aspect, a common faucet base is disposed on an underside of a sink. The common faucet base is configured to accommodate a plurality of faucet heads having different faucet styles. In an aspect, the common faucet base includes the remote valve. In an aspect, the remote valve is separate from the common faucet base and in fluid communication with the common faucet base. In an aspect, the faucet communicates over a wire to the control unit and in an aspect, the faucet communicates wirelessly with the control unit.

In an aspect, the control unit includes an electronic thermostat for each water dispensing device controlled by the control unit.

In an aspect, a flow meter is disposed in a line to a faucet and is coupled to the control unit. A controlled valve is also coupled in the line to the faucet and coupled to the control unit. In an aspect, the control unit controls the controlled valve based on input from the flow meter to dispense precise quantities of water from the faucet. In an aspect, the control unit controls the controlled valve based on input from the flow meter to purge the line to the faucet line and then communicates to a user regarding when to start collecting water being discharged from the faucet, such as by placing a cup under the faucet.

Figure 8:
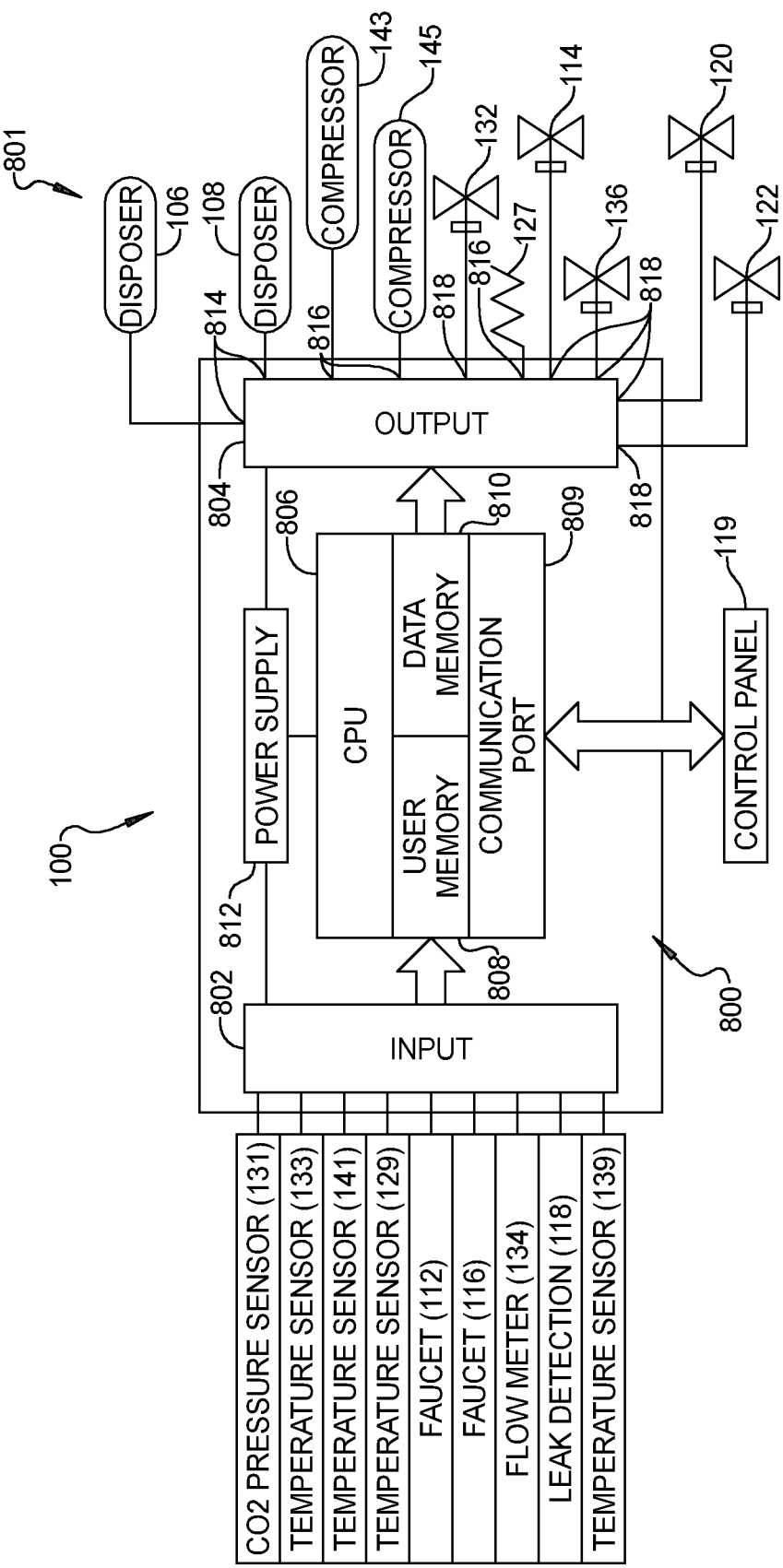
FIG. 8 is a simple block diagram of the control unit of FIG. 1.

FIG. 1 is a simplified diagram showing an under sink control unit 100 in accordance with an aspect of the present disclosure coupled to various undersink appliances that are controlled by under sink control unit 100 and to various sensors and other input devices that provide inputs to control unit 100 that control unit 100 uses in controlling the various devices. FIG. 8 is a simplified block diagram of control unit 100 also showing it coupled to the various undersink appliances 801 and to sensors and other input devices. Undersink appliances 801 may include food waste disposers, water dispensing devices of a water dispensing system and associated devices such as controlled valves and electronic mixing valves. It should be understood that the term "undersink appliances" is used as such devices are typically mounted underneath a sink, such as in a cabinet beneath a sink received in a top of the cabinet. However, an undersink appliance need not necessarily be mounted under the sink and for example, a water dispensing device could be mounted on the top of the cabinet next to the sink.

In the example shown in FIG. 1, control unit 100 is coupled to a source of electrical line power 102, such as to an electrical outlet 104. In this example, electrical outlet 104 is the sole source of electrical line power to control unit 100. Control unit 100 illustratively includes a controller 800 (FIG. 8) and various inputs 802 and controlled power outputs 804 coupled to the controller 800 that can accommodate the control of various devices. In an aspect, controller 800 also includes a central processing unit 806, such as a microprocessor, user memory 808, data memory 810 and a power supply 812. As described in more detail below, control unit 100 turns power at the controlled power outputs 804 on and off and limits the controlled power outputs at which it turns power on so that current drawn from the controlled power outputs 804 does not exceed a maximum rated input current of control unit 100. In an aspect, the maximum rated input current of control unit 100 is the maximum rated current of electrical outlet 104, for example, 20 amps at 120 VAC.

In the example of FIG. 1 and also with reference to FIG. 8, control unit 100 controls two food waste disposers 106, 108, a drinking water dispensing system 110 that provides drinking water from one or more types of drinking water dispensing devices to a drinking water faucet 112, an electronic mixing valve 114 that controls the flow of hot and cold tap water to a tap water faucet 116. With reference to FIG. 8, controlled power outputs 804 include food waste disposer power outputs 814 that are coupled to food waste disposers, water dispensing device power outputs 816 that are coupled to water dispensing devices and controlled valve power outputs 818 that are coupled to controlled valves. A leak detector 118 is also coupled to control unit 100 as is a control panel 119. Control panel 119 illustratively communicates wirelessly with control unit 100 in the example shown in FIG. 1, but could be hard wired to control unit 100. Leak detector 118 is illustratively hard wired to control unit 100, but could be configured to communicate wirelessly with control unit 100. Each food waste disposer 106, 108 has a motor electrically coupled to a respective food waste disposer power output 814 of control unit 100, which in an aspect may be a motor control input/output (I/O). In an aspect, the motors of food waste disposers 106, 108 are each a brushless DC motor (BLDC motor) and are coupled to their respective food waste disposer power output 814 of control unit 100 for communications and power. Control unit 100 provides BLDC motor control of the BLDC motors of food waste disposers 106, 108 that illustratively includes on/off, speed, direction, current and/or power monitoring and overload protection. It should be understood that each motor could be a type of motor other than a BLDC motor and the food waste disposer power output 814 of control unit 100 for that motor is then a motor control output for that type of motor. Alternatively, it should be understood that any of the food waste disposers could include the motor controller and control unit 100 then configured to provide only power to the food waste disposer at food waste disposer power output 814 and communication of user inputs to the food waste disposer. It should also be understood that each motor could be other than a BLDC motor, such as by way of example and not of limitation, an asynchronous motor, a synchronous induction motor, a switched reluctance motor, a universal motor, or a permanent magnet DC motor.

In an aspect, controlled valves 120, 122 (FIG. 2) are fluidly coupled in series with a water supply line 124 and water inlets of food waste disposer 106, 108, respectively and have control inputs in communication (hard wired or wireless) with control unit 100. Controlled valves 120, 122 may illustratively be solenoid valves. Control unit 100 is then for example configured to control flow of water from water supply line into food waste disposers 106, 108 such as by cycling controlled valves 120, 122, open and closed, to better optimize grind, with this water control feature referred to herein as "auto water."

In the example shown in FIG. 1, drinking water dispensing system 110 is configured to provide three different types of drinking water to drinking water faucet 112 from three different types of drinking water dispensing devices—hot water from a hot water dispenser 126, carbonated water from a carbonated water dispenser 128 and chilled water from a chiller 130, all of which are controlled by control unit 100. In the example of FIG. 1, drinking water dispensing system 110 includes a controlled valve 132, a flow meter 134, a filter 135 and a 3-in-1 controlled valve 136 fluidly coupled in series between water supply line 124 and inlets of hot water dispenser 126, carbonated water dispenser 128 and chiller 130. Outlets of hot water dispenser 126, carbonated water dispenser 128 and chiller 130 are fluidly coupled to drinking water faucet 112 via drinking water supply line 137. These devices are electrically coupled to control unit 100 for both power and control. Power to hot water dispenser 126, carbonated water dispenser 128 and chiller 130 for example is provided by control unit 100 via power outputs 816 of control unit 100 electrically connected to these devices via power cords. Control communication between these devices and control unit 100 can be via hardwired electrical connections and/or wireless communication. Similarly, control communication between controlled valves 132, 136 and control unit 100 can be via hardwired electrical connections and/or wireless communication. Controlled valve 132 is illustratively an on/off valve, such as a conventional solenoid valve. 3-in-1 valve is illustratively a conventional 3-in-1 valve having one inlet and three outlets that are selectively fluidly coupled to the inlet based on a control input provided to the 3-in-1 valve, in this case, by control from control unit 100. It should be understood that the 3-in-1 valve could be replaced with individual electronically controlled valves (such as solenoid valves) coupled to respective ones of the water dispensing devices and coupled to drinking water supply line 137 through a manifold. It should be understood that the individual electronic controlled valves could be replaced by individual electronic controlled pumps that are coupled to respective water dispensing devices and coupled to the drinking water supply line 137 through a manifold. When activated the pump draws water from tanks of the respective water dispensing devices. It should also be understood that the individual electronic controlled valves 136 could be moved upstream of the water dispensing devices coupled to the drinking water supply line 137. In this instance the tanks of the water dispensing devices would be pressurized.

With regard to hot water dispenser 126, control unit 100 is configured to monitor water temperature in hot water dispenser 126 and controls a heating element 127 (FIG. 8) of hot water dispenser 126 to maintain a desired temperature of the water in a tank (not shown) of hot water dispenser 126. In this aspect, there is a temperature sensor 129 (FIG. 8) that is in communication (hard wired or wireless) with control unit 100 that senses the temperature of the water in the tank of hot water dispenser 126 and this temperature is communicated to control unit 100. In an aspect, control unit 100 is also configured to heat the water in the tank of hot water dispenser 126 during a time selected by a user, such as via control panel 119.

With regard to carbonated water dispenser 128, control unit 100 is configured to monitor pressure in a $CO_2$ cartridge (not shown) of carbonated water dispenser 128 and there is a pressure sensor 131 (FIG. 8) disposed to sense the pressure in the $CO_2$ cartridge that is in communication (hard wired or wireless) with control unit 100. Control unit 100 is configured to monitor the temperature of the water in a tank (not shown) of carbonated water dispenser 128 and control a compressor 143 of a refrigeration unit (not shown) that cools the water in the tank of carbonated water dispenser 128. Control unit 100 is also configured to communicate to a user via control panel 119 status/temperature of carbonated water in the tank of carbonated water dispenser 128 and the temperature of that water. It should be understood that a reference herein to the temperature of carbonated water dispenser 128 means the temperature of water in the tank of carbonated water dispenser 128. In this aspect, there is a temperature sensor 133 (FIG. 8) that is in communication (hard wired or wireless) with control unit 100 that senses the temperature of the water in the tank of carbonated water dispenser 128 and this temperature is communicated to control unit 100.

With regard to chiller 130, control unit 100 is configured to monitor the temperature of the water in a tank (not shown) of chiller 130 and control a compressor 145 of a refrigeration unit (not shown) that cools the water in the tank of chiller 130. Control unit 100 is also configured to communicate to the user via control panel 119 status/temperature of the chilled water in the tank. In this aspect, there is a temperature sensor 141 (FIG. 8) that is in communication (hard wired or wireless) with control unit 100 that senses the temperature of the water in the tank of chiller 130 and this temperature is communicated to control unit 100. In an aspect, control unit 100 is also configured to cool the water in the tank of chiller 130 during a time selected by a user via control panel 119. It should be understood that a reference herein to the temperature of chiller 130 means the temperature of water in the tank of chiller 130.

Control unit 100 is also configured to control 3-in-1 valve 136 when a user selects a type of water to be provided, such as via control panel 119 or by actuating an actuator of drinking water faucet 112, for example a handle (not shown) and moving the handle to an open position which is communicated to control unit 100. For example, when the user selects hot water, control unit 100 controls 3-in-1 valve so that the outlet of 3-in-1 valve fluidly coupled to hot water dispenser 126 is fluidly coupled to the inlet of 3-in-1 valve 136. Water then flows from water supply line 124 through controlled valve 132, flow meter 134, filter 135 and 3-in-1 valve 136 into hot water dispenser 126. This forces hot water in hot water dispenser out through the outlet of the hot water dispenser 126 to drinking water faucet 112.

Flow meter 134 monitors the flow of water to the selected water dispensing device (hot water dispenser 126, carbonated water dispenser 128 or chiller 130 in the example configuration of FIG. 1) which is communicated to control unit 100. Control unit 100 is configured to use this information for control and communications. In an aspect, control unit 100 is configured to use the water flow amount to determine the remaining useful life of filter 135. In another aspect, the control unit 100 uses the water flow information from flow meter 134 to dispense an amount of drinking water selected by a user such as via control panel 119. In another aspect, control unit 100 is configured to use the water flow amount to determine an amount of usable water remaining in the selected one of the tank of hot water dispenser 126, the tank of the carbonated water dispenser 128 or the tank of chiller 130 based on how much water has been drawn and the temperature in the tank.

In an aspect, control unit 100 is configured to close controlled valve 132 upon leak detector 118 detecting the presence of water on a floor of a cabinet in which the sink is mounted, upon water flow being detected by flow meter 134 when a user has not selected a water dispensing device of drinking water dispensing system 110 to provide water to drinking water faucet 112, has not selected tap water to be supplied to tap water faucet 116 or upon the water flow being detected by flow meter 134 exceeding a normal flow rate of the selected water dispensing device of drinking water dispensing system 110.

In an aspect, since all the water for all the water dispensing devices of drinking water dispensing system 110 flows through a single supply line, drinking water supply line 137, to drinking water faucet 112, control unit 100 is configured to purge drinking water supply line 137 upon switching from one type of drinking water being dispensed to a next type of drinking water. It does so by waiting until the next type of drinking water has been run for a period of time or a predetermined volume as measured by flow meter 134 has been dispensed before alerting a user, such as via control panel 119, to place a container (such as a cup) under the drinking water faucet 112. By waiting until the alert has been provided before placing the container under the drinking water faucet 112, the first type of water will have has been purged from drinking water supply line 137 by the flow of the next type of water by the time the user places the container under the drinking water faucet 112. Thus, only the next type of water will be received in the container. In an aspect, drinking water faucet 112 has one or more visible indicators (not shown), such as a LED(s), that is illuminated by control unit 100 to for example indicate when the purge of drinking water supply line 137 is complete and when to place the container under the drinking water faucet 112.

In an aspect, control unit 100 is configured to control 3-in-1 valve 136 to dispense a selected volume of the type of drinking water selected by a user, such as via control panel 119 or other input device that communicates with control unit 100. In an aspect, control unit 100 is configured to control a desired temperature of the water dispensed by drinking water faucet 112 if this temperature is different than the water temperature of water delivered from any of the water dispensing devices, the hot water dispenser 126 and chiller 130 in particular. In this aspect, the desired temperature is selected by a user, such as via control panel 119. Also in this aspect, a temperature sensor 139 that communicates with control unit 100 is provided in drinking water supply line 137 downstream of all of the outlets of hot water dispenser 126, carbonated water dispenser 128 and chiller 130. Control unit controls mixing of hot and cold water via control of the 3-in-1 valve 136 to match and maintain the user's desired temperature. As discussed above, 3-in-1 valve 136 can be replaced with three or more separate electronically controlled valves (such as solenoid valves).

In an aspect, drinking water faucet 112 and tap water faucet 116 are individual faucets. In an aspect, a single faucet serves as both drinking water faucet 112 and tap water faucet 116.

In an aspect, electronic mixing valve 114 controls flow of hot and cold tap water to tap water faucet 116. Electronic mixing valve 114 has a cold water inlet 152 fluidly coupled to a cold tap water supply line 140 and a hot water inlet 154 fluidly coupled to a hot tap water supply line 142. Supply lines 140, 142 are illustratively typical hot and cold water supply lines in a dwelling such as a house. An outlet 156 of electronic mixing valve 114 is fluidly coupled to tap water faucet 116 via a tap water supply line 144. Electronic mixing valve 114 is in communication with control unit 100 (hard wired or wireless) and is controlled by control unit 100 to provide hot, cold or a mixture of hot and cold tap water to tap water faucet 116 in response to a user actuating an actuator (not shown) of tap water faucet 116, such as a handle (not shown). In an aspect, a desired temperature and flow rate of water dispensed by tap water faucet 116 is determined by a position of the actuator that is communicated to control unit 100. Control unit 100 in response to the communicated actuator position controls electronic mixing valve 114 to provide the water to tap water faucet 116 at the desired temperature and flow rate. In an aspect, control unit 100 also controls electronic mixing valve 114 for advanced functions based on inputs from control panel 119 and/or other input devices, such as sensors. In an aspect, an advanced function includes temperature control based on a temperature sensor in communication with control unit 100 that is disposed downstream of the outlet of electronic mixing valve 114 that communicates with control unit 100. Control unit 100 controls electronic mixing valve 114 to mix the hot and cold tap water provided to electronic mixing valve 114 to match and maintain the temperature of the water downstream of the outlet of electronic mixing valve 114 to a temperature set by a user, such as via control panel 119. In an aspect, control unit 100 is configured to control electronic mixing valve 114 to dispense a volume of water selected by a user, such as via control panel 119. In this aspect, a flow meter (not shown) in communication with control unit 100 is fluidly coupled to the outlet of electronic mixing valve 114. Control unit 100 monitors the flow rate of water via this flow meter and controls electronic mixing valve 114 to provide the desired flow rate or volume of water selected by the user.

Control unit 100 illustratively includes one or more wireless ports 138. Each wireless port can have any type of wireless communication technology, including but not limited to Wi-Fi, Bluetooth, ZigBee and Z-wave. The wireless port or ports 138 can be used to communicate with the control inputs/outputs of the above discussed devices, control panel 119, a wireless router 146 that is connected to the Internet, and/or a smart device 148 such as a smart phone or tablet.

In an aspect, a user operates the food waste disposers 106, 108, drinking water dispensing system 110 and sets functionality thereof via control panel 119. In addition to those functions for which control panel 119 is used as described above, in an aspect this includes operating the food waste disposers 106, 108 and setting their functionality including any, or any combination of, turning the food waste disposers 106, 108 on and off and selecting which food waste disposer 106, 108 to operate, auto water, auto shut-off upon sensing that grinding of food waste in the food waste disposer being operated is complete, and self-cleaning mode. In the self-cleaning mode, the speeds of the motors of the food waste disposers 106, 108 is increased above normal grind speeds and controlled valves 120, 122 are open to increase water spray to cleanse interiors of disposers 106, 108. In an alternative having a disposer with a motor that runs in one direction during grinding (referred to as the grind direction), the motor is run in an opposite direction to help hold water inside the disposer to aid in cleansing and then run in the grind direction for final cleanout. In an aspect, this functionality set via control panel 119 includes setting temperature profiles for each of the water dispensing devices including desired water temperature and time for heating or cooling (depending on the device). In an aspect, this includes communicating information about filter 135, such as remaining life, resetting filter life such as after it or the filter media is replaced (depending on the type of filter), ordering new filters or filter media. In an aspect, this includes checking the Internet for software updates such as for control unit 100. In an aspect, this includes troubleshooting food waste disposers 106, 108 and drinking water dispensing system 110. Troubleshooting includes communicating to a desired destination, such as control panel 119, wireless router 146 that communicates with a device such as a PC, or smart phone 148 whether a disposer is jammed or its motor overheated, and/or a heater 127 of hot water dispenser 126 is not working, compressor 143 of carbonated water dispenser 128 is not working, or compressor 145 of chiller 130 is not working, or they are working outside of normal operating parameters. In an aspect, control unit 100 communicates with a smart mobile device such as a smart phone 148 that provides any or all the same functionality as control panel 119. In this regard, control unit 100 is configured to sense such trouble conditions of food waste disposers 106, 108, and the devices of drinking water dispensing system 110. For example, if the motors of food waste disposers 106, 108 are BLDC motors, the signals from the typical rotor position sensor are used by control unit 100 to determine if the motors are not rotating when they should be thus sensing that the motors are stalled. Further for example, a current sensor (not shown) is coupled to each motor of each food waste disposer 106, 108 and the control unit 100 and control unit 100 uses current sensed by the current sensor to determine if any of those motors is overloaded. With regard to hot water dispenser 126, control unit 100 for example is configured with control logic that determines that heating element 127 of hot water dispenser 126 is not working if a temperature sensed by temperature sensor 129 of hot water dispenser 126 has not heated to a predetermined temperature after the heating element 127 has been energized by control unit 100 for a predetermined period of time. Similarly in another example, control unit 100 is configured with control logic that determines that compressor 143 of carbonated water dispenser 128 is not working if a temperature sensed by temperature sensor (not shown) in a tank (not shown) of carbonated water dispenser 128 has not cooled to a predetermined temperature after the compressor 143 has been energized by control unit 100 for a predetermined period of time. Similarly in another example, control unit 100 is configured with control logic that determines that compressor 145 of chiller 130 is not working if a temperature sensed by temperature sensor 141 in a tank of chiller 130 has not cooled to a predetermined temperature after the compressor has been energized by control unit 100 for a predetermined period of time.

Since control unit 100 is shared among multiple undersink appliances, the overall cost of the system can be lowered. It could also make it attractive to put a disposer in each sink of a sink cabinet having multiple sinks. Further, adding an electronic thermostat becomes practical for each water dispensing device. In this regard, each electronic thermostat can be implemented in software in control unit 100. Each such electronic thermostat is illustratively programmable for better energy utilization for peak and non-peak times, to communicate status, water temperature and filter life to the user, and to detect and react to leaks. A tighter temperature control is will now be possible with such electronic thermostats keeping the water in the water dispensing devices at their desired temperature.

In the configuration shown in FIGS. 1 and 2, the electrical outlet 104, food waste disposers 106, 108, drinking water dispensing system 110 (including its above described components), leak detector 118 and electronic mixing valve 114 are all disposed in a sink cabinet 150 which receives a sink (or sinks) such as sink 306 (FIGS. 3 & 4). Control panel 119 is illustratively disposed at or above a top of sink cabinet 150, illustratively in proximity or adjacent to faucets 112 and 116 or to faucet 300 (depending on whether faucets 112, 116 are used or faucet 300 is used).

Figure 5A:
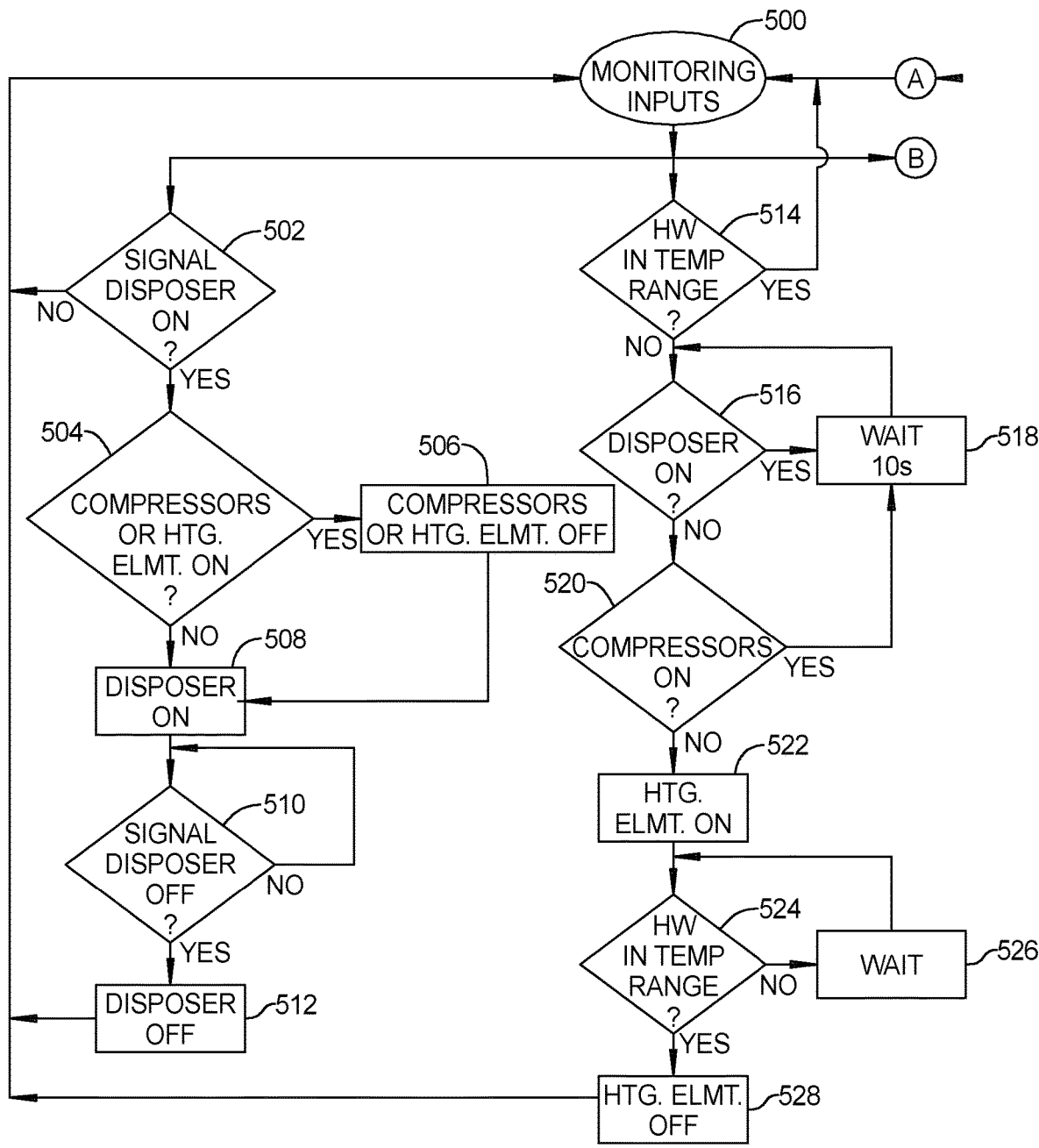
FIGS. 5A and 5B are a flow chart of a simplified control routine for control of power to the devices of the arrangement of FIG. 1 but with one food waste disposer.
Figure 5B:
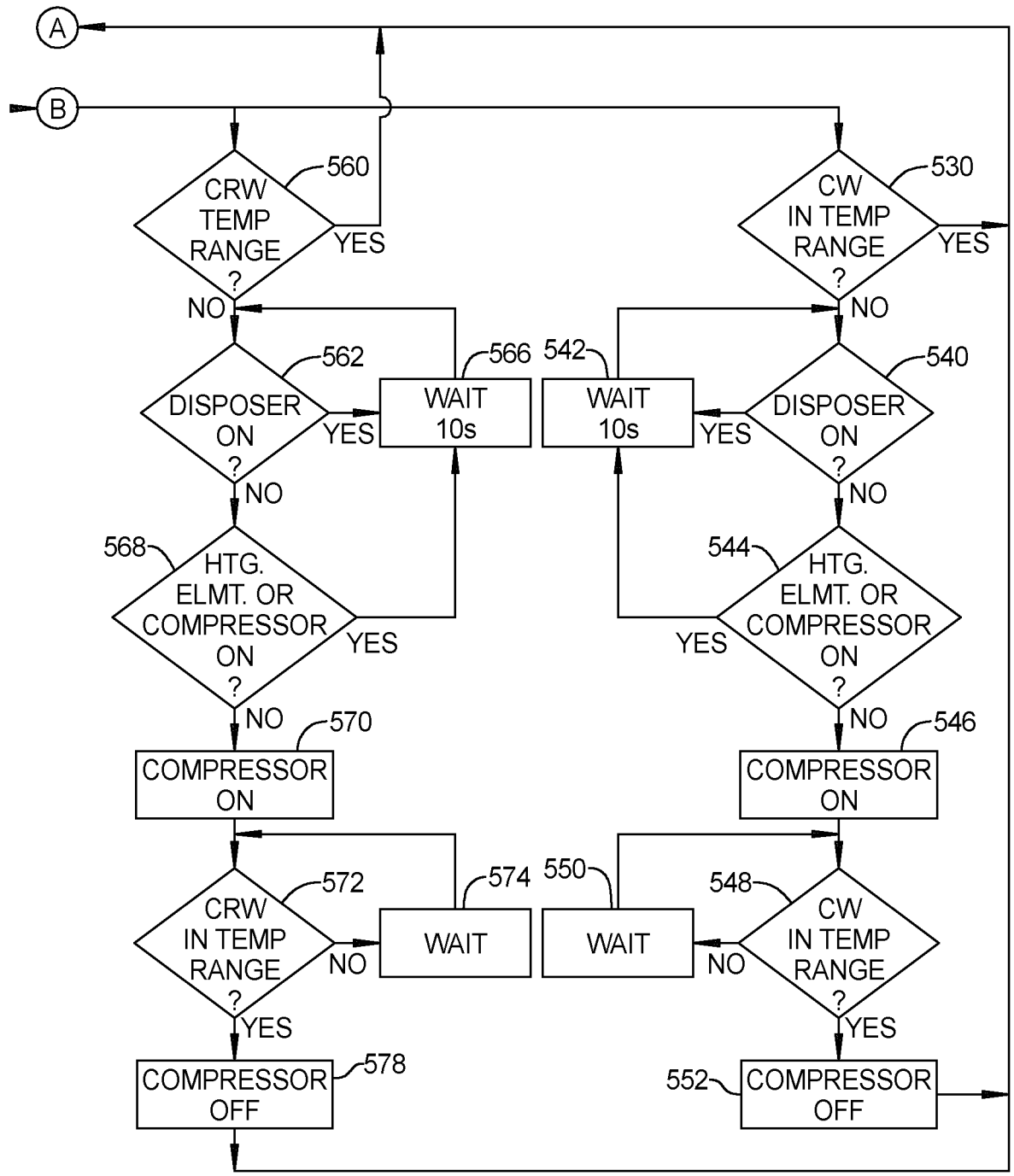

FIGS. 5A and 5B show a flow chart of a simplified control routine for control of power distribution to the devices of the arrangement of FIG. 1 but with only one of food waste disposers 106, 108. Food waste disposer 106 will be referred to as the example food waste disposer. Control unit 100 is configured to implement the control routine of FIGS. 5A and 5B, such as by software programmed into control unit 100.

At 500 (FIG. 5A), the control routine is monitoring inputs to control unit 100 and will proceed to control power to food waste disposer 106, hot water dispenser 126, carbonated water dispenser 128 and chiller 130 depending on the inputs received by control unit 100. Starting with the control of power to food waste disposer 106, at 502 the control routine checks whether a signal (such as an input from control panel 119) input was received to turn food waste disposer 106 on. If not, the control routine branches back to 500. If so, the control routine branches to 504 where it checks whether the heating element 127 of hot water dispenser 126, compressor 143 of carbonated water dispenser 128 or the compressor 145 of chiller 130 is on. If not, the control routine branches to 508 where it turns the food waste disposer 106 on. If so, the control routine branches to 506 where it turns the heating element or compressors (whichever was on) off and then branches to 508. After turning the food waste disposer 106 on at 508, the control routine branches to 510 where it checks whether a signal (such as an input from control panel 119) was received to turn food waste disposer 106 off. If not, the control routine branches back to 510. If so, it branches to 512 where it turns power to food waste disposer 106 off and then branches back to 500.

Next turning to the control of power to hot water dispenser 126, at 514 the control routine checks whether the temperature in the tank of hot water dispenser 126 is within a desired temperature range. If so, the control routine branches back to 500. If not, the control routine branches to 516 where it checks whether power to food waste disposer 106 is on. If so, the control routine branches to 518 where it waits a predetermined period of time, such as ten seconds, and then branches back to 516. If power to food waste disposer 106 was not on at 516, the control routine branches to 520 where it checks whether power to the compressor 143 of carbonated water dispenser 128 or compressor 145 of chiller 130 is on. If so, the control routine branches to 518. If not, the control routine branches to 522 where it turns power to the heating element 127 of hot water dispenser 126 on and then branches to 524 where it checks whether the temperature in the tank of hot water dispenser 126 is within the desired temperature range. If not, the control routine branches to 526 where it waits a predetermine period of time and then branches back to 524. If at 524 the temperature in the tank of hot water dispenser 126 is within the desired temperature range, the control routine branches to 528 where it turns the power off to heating element 127 of hot water dispenser 126 off and then branches back to 500. It should be understood that when the control routine is looping from 524 through 526 back to 524 and an input is received to turn food waste disposer 106 on, the control routine branches to 504.

Next turning to the control of power to carbonated water tank 128, FIG. 5B, (its compressor 143 in particular), at 560 the control routine checks whether the temperature in carbonated water dispenser 128 is within a desired temperature range. If so, the control routine branches back to 500. If not, the control routine branches to 562 where it checks whether power to food waste disposer 106 is on. If so, the control routine branches to 566 where it waits a predetermined period of time, such as ten seconds, and then branches back to 562. If power to food waste disposer 106 was not on at 562, the control routine branches to 568 where it checks whether power to the heating element 127 of hot water dispenser 126 or compressor 145 of chiller 130 is on. If so, the control routine branches to 566. If not, the control routine branches to 570 where it turns power to the compressor 143 of carbonated water dispenser 128 on and then branches to 572 where it checks whether the temperature in carbonated water dispenser is within the desired temperature range. If not, the control routine branches to 574 where it waits a predetermine period of time and then branches back to 572. If at 572 the temperature in the carbonated water dispenser is within the desired temperature range, the control routine branches to 578 where it turns off the compressor 143 of carbonated water dispenser 128 and then branches back to 500. It should be understood that when the control routine is looping from 572 through 574 back to 572, and an input is received to turn food waste disposer 106 on, the control routine branches to 504.

Next turning to the control of power to chiller 130 (its compressor 145 in particular), at 530 the control routine checks whether the temperature in chiller 130 is within a desired temperature range. If so, the control routine branches back to 500. If not, the control routine branches to 540 where it checks whether power to food waste disposer 106 is on. If so, the control routine branches to 542 where it waits a predetermined period of time, such as ten seconds, and then branches back to 540. If power to food waste disposer 106 was not on at 540, the control routine branches to 544 where it checks whether power to the heating element 127 of hot water dispenser 126 is on or power to compressor 143 of carbonated water dispenser 128 is on. If so, the control routine branches to 542. If not, the control routine branches to 546 where it turns power to the compressor 145 of chiller 130 on and then branches to 548 where it checks whether the temperature in chiller 130 is within the desired temperature range. If not, the control routine branches to 550 where it waits a predetermine period of time and then branches back to 548. If at 548 the temperature in the chiller 130 is within the desired temperature range, the control routine branches back to 552 where it turns the compressor 145 of chiller 130 off and then branches back to 500. It should be understood that when the control routine is looping from 548 through 550 back to 548 and an input is received to turn food waste disposer 106 on, the control routine branches to 504.

Figure 6:
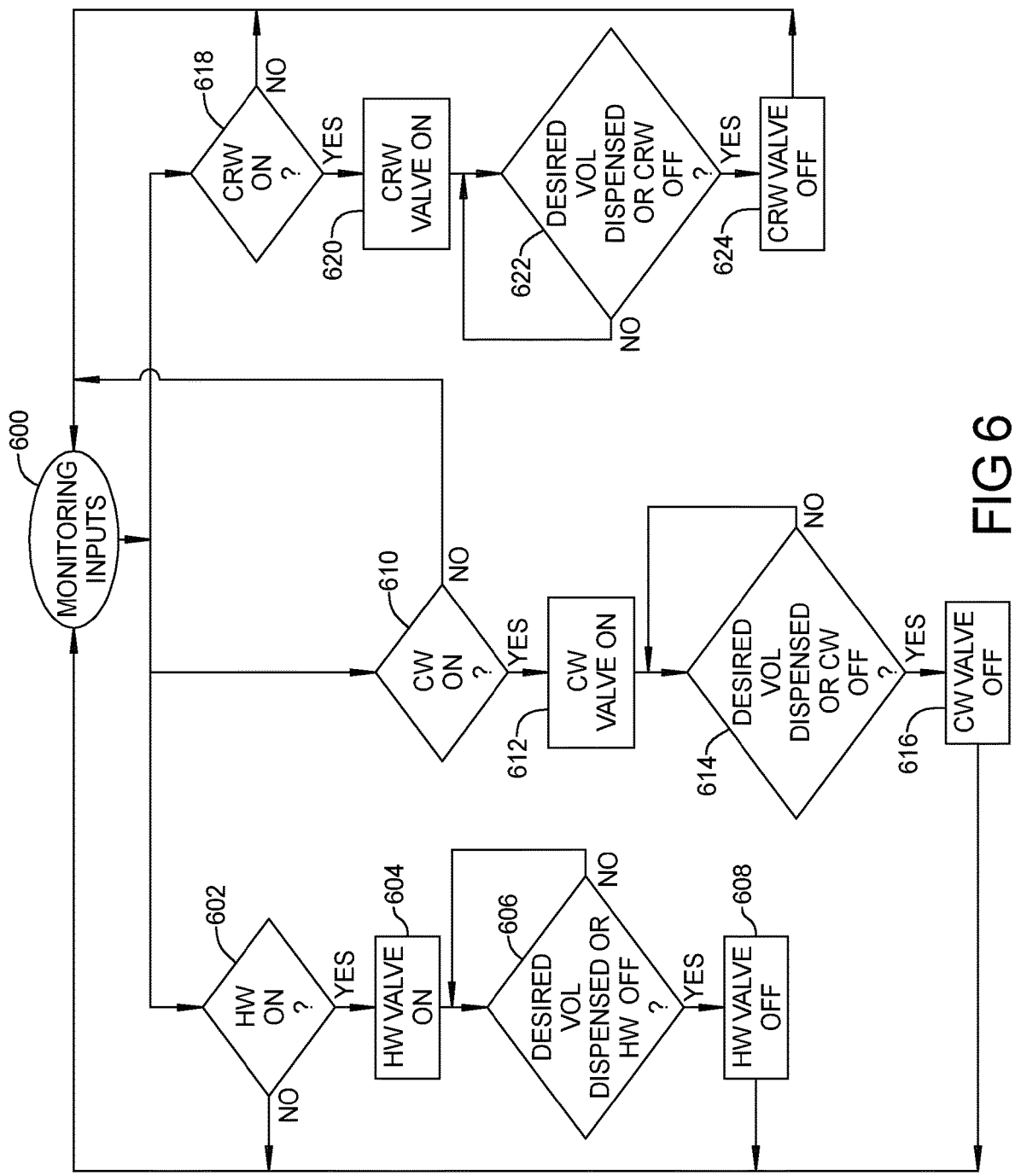
FIG. 6 is a flow chart of a simplified control routine for control of the water dispensing devices of the arrangement of FIG. 1.

FIG. 6, a flow chart of a simplified control routine for control of the water dispensing devices of the arrangement of FIG. 1 for dispensing water from such water dispensing devices. Control unit 100 is configured to implement the control routine of FIG. 6, such as by software programmed into control unit 100.

Turning first to hot water dispenser 126, at 600 the control routine is monitoring inputs to control unit 100 and will control 3-in-1 valve 136 to dispense hot water, chilled water or carbonated water depending on the inputs received. At 602 the control routine checks whether a signal (such as an input from faucet 300) was received to dispense water from hot water dispenser 126. If not, the control routine branches back to 600. If so, the control routine branches to 604 where it controls 3-in-1 valve 136 to move to the hot water dispensing position. The control routine then branches to 606 where it checks whether to cease dispensing water from hot water dispenser 126, such as due to a desired amount of hot water having been dispensed or a signal (such as an input from faucet 300 or control panel 119) received to turn off dispensing of water from hot water dispenser 126. The control routine branches back to 606 if it was determined not to cease dispensing water from hot water dispenser 126. The control routine branches to 608 where it turns 3-in-1 valve 136 off to cease dispensing water from hot water dispenser 126 if it was determined at 606 that such dispensing was to stop.

Turning next to chiller 130, at 610 the control routine checks whether a signal (such as an input from faucet 300) was received to dispense water from chiller 130. If not, the control routine branches back to 600. If so, the control routine branches to 612 where it controls 3-in-1 valve 136 to move to the chilled water dispensing position. The control routine then branches to 614 where it checks whether to cease dispensing water from chiller 130, such as due to a desired amount of chilled water having been dispensed or a signal (such as an input from faucet 300 or control panel 119) received to turn off dispensing of water from chiller 130. The control routine branches back to 614 if it was determined not to cease dispensing water from chiller 130. The control routine branches to 616 where it turns 3-in-1 valve off to cease dispensing water from chiller 130 if it was determined at 614 that such dispensing was to stop, and then branches back to 600.

Turning next to carbonated water dispenser 128, at 618 the control routine checks whether a signal (such as an input from faucet 300) was received to dispense water from carbonated water dispenser 128. If not, the control routine branches back to 600. If so, the control routine branches to 620 where it controls 3-in-1 valve 136 to move to the carbonated water dispensing position. The control routine then branches to 622 where it checks whether to cease dispensing water from carbonated water dispenser 128, such as due to a desired amount of carbonated water having been dispensed or a signal (such as an input from faucet 300 or control panel 119) received to turn off dispensing of water from carbonated water dispenser 128. The control routine branches back to 622 if it was determined not to cease dispensing water from carbonated water dispenser 128. The control routine branches to 624 where it turns 3-in-1 valve off to cease dispensing water from carbonated water dispenser 128 if it was determined at 622 that such dispensing was to stop, and then branches back to 600.

It should be understood that if separate electronically controlled valves are used instead of 3-in-1 valve 136, then the control routine controls the separate electronically controlled valves to dispense hot water, chilled water or carbonated water depending on the inputs received.

It should be understood that in an aspect a reference to an input from faucet 300 means an input received from user interface 352 (discussed below) of faucet 300.

Figure 7:
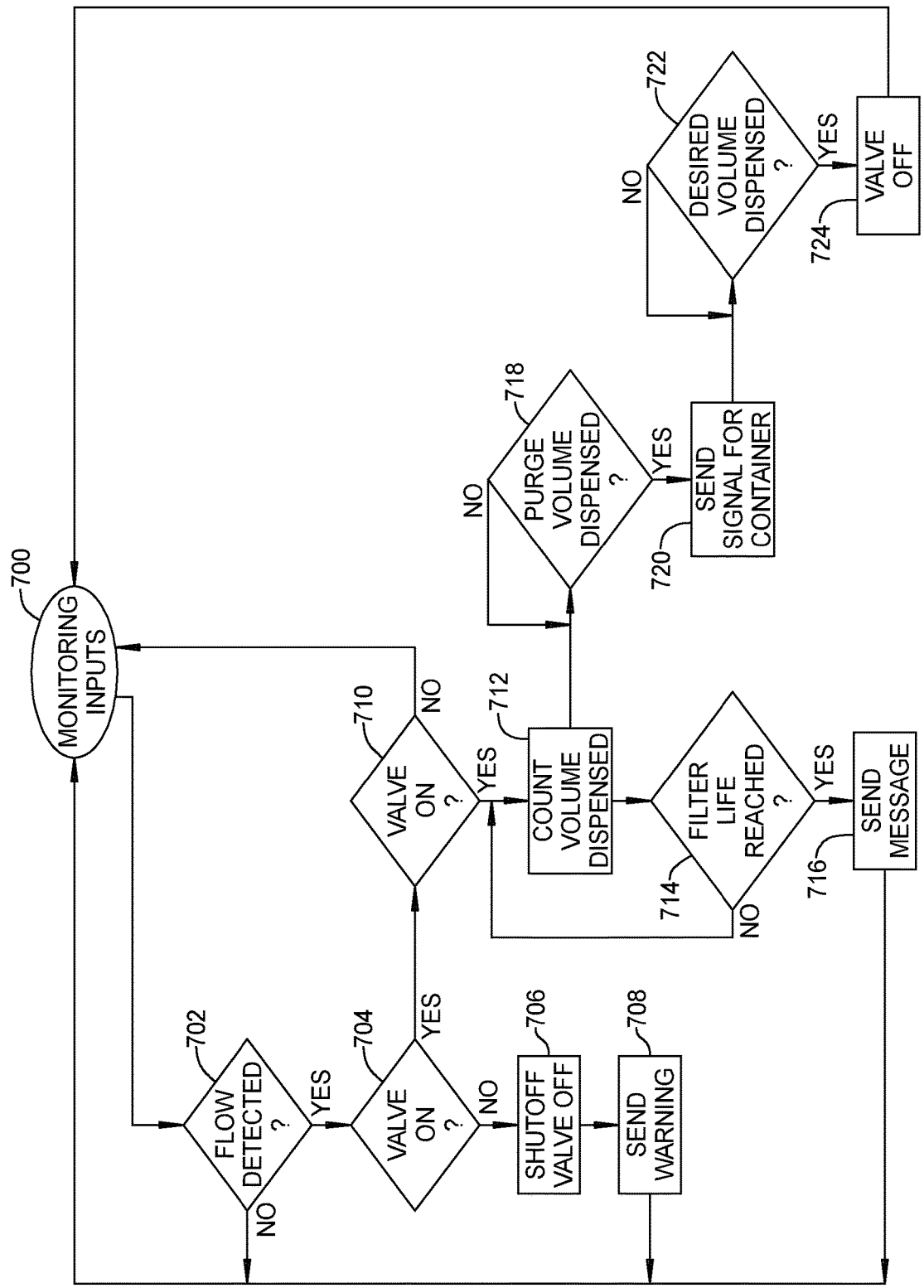
FIG. 7 is a flow chart of a simplified monitoring routine using a flow meter to monitor for and signal leaks, filter life, purge sequence and dispensing of a set volume of water.

FIG. 7 is a flow chart of a simplified monitoring routine using a flow meter such as flow meter 134 to monitor for and signal leaks, filter life, purge sequence and dispensing of a set volume of water. Control unit 100 is configured to implement the control routine of FIG. 7, such as by software programmed into control unit 100.

At 700, the monitoring routine is monitoring inputs to control unit 100. At 702, the monitoring routine checks whether flow has been detected by flow meter 134. If not, the monitoring routine branches back to 700. If so, at 704 the control routine checks whether 3-in-1 valve 136 is in an open position. In an aspect, if flow meter 134 is positioned so that it also downstream of electronic mixing valve 114, the control routine also checks if electronic mixing valve 114 is open. If not, at 704 the monitoring routine branches to 706 where it closes controlled valve 132 and at 708 sends a warning to a user that there is a leak, such as via control panel 119. The monitoring routine then branches back to 700.

If at 704 electronic mixing valve 114, 3-in-1 valve 136, or both, were in an open position, the monitoring control routine branches to 710 where it checks whether 3-in-1 valve 136 was in an open position. If not, the monitoring routine branches back to 700. If so, the control routine branches to 712 and in parallel to 718. At 712, the monitoring routine counts a volume of water dispensed based on input from the flow meter 134 and then branches to 714 where it checks whether a useful life of filter 135 has been reached. It does so based on the counted volume of water that has flown through flow meter 134 and thus through filter 135. If not, the monitoring routine branches back to 712. If the useful life of filter 135 has been reached, the monitoring routine branches to 716 where it sends a message to a user, such as via control panel 119 and then branches back to 700.

At 718, the monitoring routine checks whether a purge volume of water has been dispensed, again based on water that has flown through flow meter 134. It should be understood that at this juncture, the control routine of FIG. 6 is also being executed to select the type of water to be dispensed. If at 718 the desired volume of purge water has not been dispensed, the monitoring routine branches back to 718. If so, the monitoring routine branches to 720 where it sends a signal, such as via control panel 119 or LED display 350, alerting a user to place a container under faucet 300. The monitoring routine then branches to 722 where it checks whether a desired volume of water has been dispensed. If not, the monitoring routine branches back to 722. If the desired volume of water has been dispensed at 722, the monitoring routine branches to 724 where it turns 3-in-1 valve 136 off and the branches back to 700. In an aspect, temperature sensor 139 could also be used to indicate that the purge is complete by monitoring temperature in drinking water supply line 137. When the water in drinking water supply line 137 reaches a selected temperature, the control routine sends a signal, such as via control panel 119 or LED display 350 (FIG. 4), alerting a user to place a container under faucet 300.

It should be understood that control unit 100 may be, be part of, or include an Application Specific Integrated Circuit (ASIC); an electronic circuit; a combinational logic circuit; a field programmable gate array (FPGA); a processor (shared, dedicated, or group) that executes code; a programmable logic controller, programmable control system such as a processor based control system including a computer based control system, a process controller such as a PID controller, or other suitable hardware components that provide the described functionality or provide the above functionality when programmed with software as described herein; or a combination of some or all of the above, such as in a system-on-chip. The term module may include memory (shared, dedicated, or group) that stores code executed by the processor. The term software, as used herein, may refer to computer programs, routines, functions, classes, and/or objects and may include firmware, and/or microcode. When it is stated that control unit 100 performs a function, it should be understood that control unit 100 is configured to do so such as by appropriate software, electronic circuit(s) including discrete and integrated logic, or combination thereof.

In an aspect, either or both drinking water faucet 112 and tap water faucet 116 have a faucet base disposed below the sink and a faucet head disposed above the sink and that is secured to the faucet base. In this regard, the faucet head can be any of a plurality of different types of faucet heads. By way of example and not of limitation, the faucet head can be a fixed faucet head or a swivel faucet head. The faucet head can also have any of a plurality of different spout configurations. The faucet head can also have any of a plurality of activation configurations such as a lever (or levers), button (or buttons) or touch sensing.

With reference to FIGS. 3 and 4, a faucet 300 that in accordance with an aspect of the present disclosure serves as both drinking water faucet 112 and tap water faucet 116 is described. Faucet 300 includes undersink faucet base 302 and above sink faucet head 304. Faucet base 302 is configured to be disposed beneath a sink 306 and faucet head 304 configured to be disposed above sink 306 and secured to faucet base 302. In an aspect, faucet base 302 includes an externally threaded body 308 that extends upwardly (as oriented in FIG. 3) from a radially outwardly extending bottom flange 310. Faucet base 302 is positioned with bottom flange 310 beneath sink 306 with threaded body 308 extending upwardly through an opening 309 in sink 306. A sink locking nut 311 is placed on threaded body 308 above sink 306 and tightened on threaded body 308 against a top 312 of sink 306. Faucet base 302 includes a tap water inlet 314 to which a tap water outlet 156 of electronic mixing valve 114 is fluidly coupled such as via tap water supply line 144 and a drinking water inlet 316 to which drinking water supply line 137 is fluidly coupled. Faucet base 302 includes a tap water passage 318 extending upwardly there through from tap water inlet 314 to a tap water outlet 320 of faucet base 302 and a drinking water passage 322 extending upwardly there through from drinking water inlet 316 to a drinking water outlet 324 of faucet base 302.

Faucet head 304 includes a spout 326 having a lower portion 327 surrounding and secured to an upper fitting 328. Upper fitting 328 is secured to base 302, such as by a locking nut 330 that is threadably tightened on threaded body 308 of base 302. Upper fitting 328 illustratively includes a radially outwardly extending bottom flange 332 that is captured between locking nut 330 and a top 334 of threaded body 308 of base 302 when locking nut 330 is tightened on threaded body 308. Upper fitting 328 includes tap water passage 336 and drinking water passage 338 that mate with tap water outlet 320 and drinking water outlet 324 of base 302 and a vent passage 343 that mates with a vent port 303 of base 302 and extend through upper fitting 328 to open into a water passage 340 in an interior 342 of spout 326 that opens to an outlet 344 (FIG. 4) at a distal end 346 (FIG. 4) of spout 326. Vent port 303 is coupled to the tank of hot water dispenser 126 to vent this tank in known fashion. The interior 342 of spout 326 may be hollow to provide water passage 340. In an aspect tap water passage 336, drinking water passage 338 and vent passage 343 continue up through the interior of the spout 342 as separate passages and exit at outlet 344. Faucet head 304 further includes a cover 348 that surrounds a lower portion of upper fitting 328 and a portion of threaded body 308 of faucet base 302 that is above the top 312 of sink 306. In an aspect, cover 348 includes an LED display 350 (FIG. 4) that is controlled by control unit 100 to indicate water selections. It should be understood that electronic mixing valve 114 could be disposed in faucet base 302 or separate from faucet base 302.

In an aspect, faucet head 304 includes a user interface 352 (FIG. 4) that is electronically interfaced with faucet base 302. User interface 352 illustratively includes LED display 350. Faucet base 302 is interfaced via a wiring harness 354 to control unit 100. Alternatively, faucet base 302 is wirelessly interfaced with control unit 100. Alternatively, user interface 352 is wirelessly interfaced with control unit 100. User interface 352 includes an actuator 356, such as a lever, button, or touch pad that a user uses to select and control the water being dispensed. This includes selecting whether tap or drinking water is to be dispensed through faucet 300. If drinking water is selected, this includes the type of drinking water (for example, hot, carbonated chilled) and the flow rate. If tap water is selected, this includes the mix of hot and cold tap water and the flow rate. In an aspect, actuator 356 is movable in a range between a hot position and a cold position and between a full open position and a full closed position In aspect shown in FIGS. 3 and 4, because the above sink portion of faucet 300 is simplified and free of having to contain a valve, design, qualification and agency approval times can all be shortened and inventory caring costs can be lowered as well.

It should be understood that while faucet 300 was described as serving as both a tap water faucet and a drinking water faucet, in an aspect it is configured to serve as only a tap water faucet and the drinking water elements can thus be eliminated and in an aspect does not have the drinking water elements. In another aspect, faucet 300 is configured to serve as only a drinking water faucet and the tap water elements can thus be eliminated and in aspect does not have the tap water elements.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A control unit for controlling a plurality of undersink appliances, comprising:
   a plurality of controlled power outputs at which the control unit turns power on and off, each of the controlled power outputs operably coupled to a respective one of the undersink appliances;
   the plurality of controlled power outputs include at least one food waste disposer power output for one of the undersink appliances that is a food waste disposer and at least one water dispensing device power output for one of the undersink appliances that is a water dispensing device; and
   the control unit is configured with control logic responsive to a user input that power at the food waste disposer power output is to be turned on to turn power on at the food waste disposer power output and before doing so turning power off at the water dispensing device power output; and
   the control unit is configured with control logic to set functionality for the food waste disposer that includes on/off, auto-off and troubleshooting of the food waste disposer wherein troubleshooting of the food waste disposer includes the control unit responsive to input signals received from the food waste disposer and configured with control logic to determine if the food waste disposer is jammed or the motor of the food waste disposer is overheated.

2. The control unit of claim 1 wherein the plurality of controlled power outputs include a plurality of food waste disposer power outputs and the control unit is configured with control logic responsive to a user input selecting which food waste disposer power output is to be powered on and turning power on at only the food waste disposer output selected by the user and turning power off at all the other controlled power outputs before turning power on at the selected food waste disposer power output.

3. The control unit of claim 1 wherein troubleshooting of the food waste disposer includes when the food waste disposer is jammed or its motor overheated, the control unit communicating to a desired destination that the food waste disposer is jammed or its motor overheated.

4. The control unit of claim 1 wherein the control unit is configured with control logic to set functionality for the water dispensing device that includes setting a temperature profile for that water dispensing device and controlling the water dispensing device power output for that water dispensing device based on the temperature profile and a temperature signal indicative of temperature of water in that water dispensing device, the control unit also configured with control logic that includes troubleshooting the water dispensing device wherein troubleshooting the water dispensing device includes the control unit responsive to a signal received from the water dispensing device and configured with control logic to determine if the water dispensing device is operating properly.

5. The control unit of claim 4 wherein troubleshooting of the food waste disposer includes when the food waste disposer is jammed or its motor overheated, the control unit communicating to a desired destination that the food waste disposer is jammed or its motor overheated and troubleshooting of the water dispensing device includes when the water dispensing device is not working communicating to the desired destination that the water dispensing device is not working.

6. The control unit of claim 1 wherein the control unit includes an input that receives a signal indicative of a rate of flow of water through a flow meter, and the control unit configured with control logic to determine a remaining useful life of a filter in series with the flow meter based on the amount of water that has flowed through the flow meter and to communicate to a desired destination information about a remaining life of the filter which includes a user alert when a predetermined amount of water has flowed through the flow meter and resetting a filter life after the filter or a filter media of the filter is replaced.

7. The control unit of claim 1 wherein the plurality of controlled power outputs include a plurality of water dispensing device power outputs for undersink appliances that are water dispensing devices, the control unit configured with control logic to turn power off at all the water dispensing device power outputs when the control unit is to turn power on at the food waste disposer power output prior to turning power on at the food waste disposer power output.

8. The control unit of claim 7 wherein the control unit is configured with control logic responsive to a monitoring signal from any of the water dispensing devices coupled to one of the water dispensing device power outputs where the monitoring signal is indicative of conditions of water in that water dispensing device and to cycle power on and off at the water dispensing device power output to which that water dispensing device is coupled to maintain the condition of water in that water dispensing device at desired condition.

9. The control unit of claim 1 wherein the control unit is configured with control logic so that it limits the controlled power outputs at which the control unit turns power on so that power drawn from the controlled power outputs does not exceed a predetermined maximum.

10. The control unit of claim 1 wherein the controlled power outputs include at least one controlled valve power output to which a controlled valve is couplable, the control unit configured with control logic to control the controlled valve output to fluidly couple through the controlled valve a selected one of the water dispensing devices to dispense water to a drinking water faucet.

11. The control unit of claim 10 wherein the control unit is configured with control logic to control the controlled valve output to control a temperature of the water being dispensed.

12. The control unit of claim 10 wherein the control unit is responsive to an input signal from a leak detector to determine if a water leak has occurred and configured with control logic to control the controlled valve to close the controlled valve upon determination that the leak occurred and communicating a leak alert to a desired destination.

13. The control unit of claim 9 wherein the predetermined maximum of the power drawn from the controlled power outputs is a rated input current of the control unit.

* * * * *